G. S. BAKER.
APPARATUS FOR PROVING DOUGH PREPARATORY TO BAKING.
APPLICATION FILED SEPT. 22, 1913.
1,141,600.
Patented June 1, 1915.
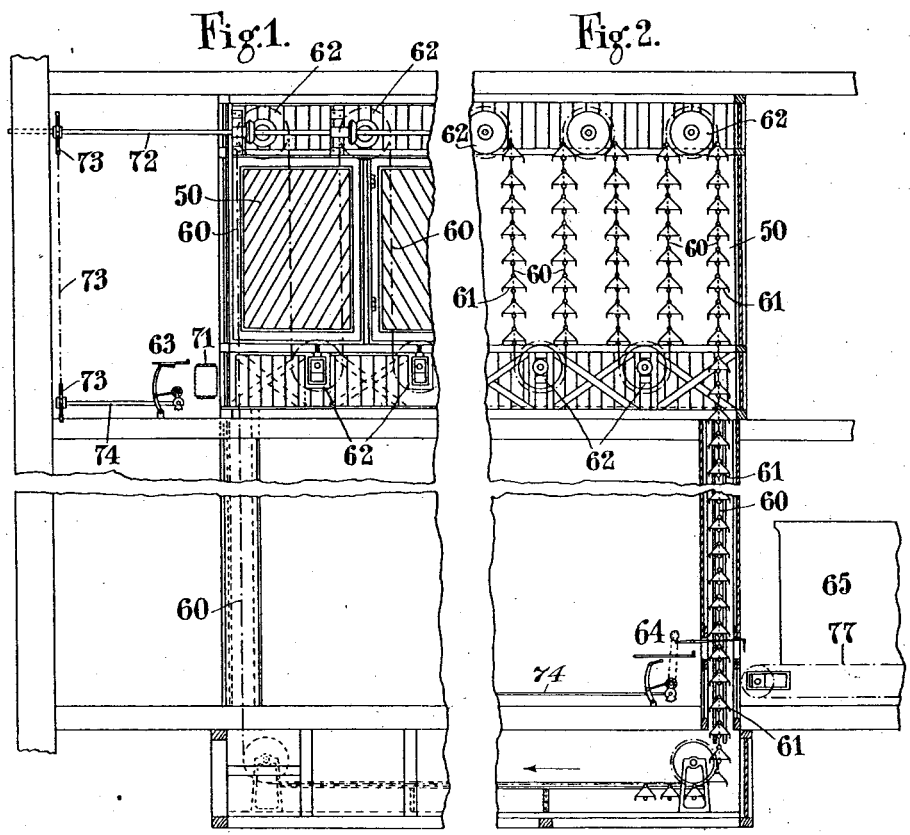
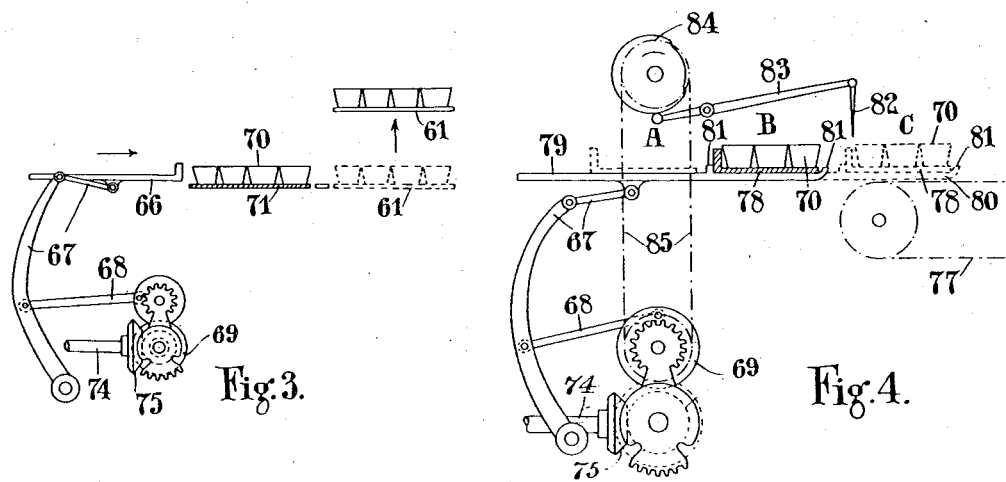
Witnesses
Inventor
George Samuel Baker
by his Attorney

UNITED STATES PATENT OFFICE.

GEORGE SAMUEL BAKER, OF LONDON, ENGLAND.

APPARATUS FOR PROVING DOUGH PREPARATORY TO BAKING.

1,141,600.  Specification of Letters Patent.  Patented June 1, 1915.

Original application filed July 13, 1909, Serial No. 507,307. Divided and this application filed September 22, 1913. Serial No. 791,050.

*To all whom it may concern:*

Be it known that I, GEORGE SAMUEL BAKER, a subject of the King of England, residing at London, in England, have invented a certain new and useful Improvement in Apparatus for Proving Dough Preparatory to Baking, of which the following is a specification.

This application is a division of my application filed July 13, 1909, Serial No. 507,307, for apparatus for treating dough.

This invention relates to apparatus for the treatment of dough preparatory to baking, and relates to apparatus concerned in the " proving " of said dough, that is to say the final proving operation between the molding thereof and its introduction into the oven.

For the purpose of this invention I may use a molding apparatus of any desired or approved construction and preferably adjacent to the discharge end or portion thereof I provide one or a series of endless-belt or other conveyers on which are placed the known "setting" trays or boards on which the molded masses of dough either in tins or otherwise are placed in series or rows according to the capacity of said trays. The said conveyer carries the trays or boards or tins with a comparatively slow continuous or intermittent movement (during which time they are filled with loaves to be proved) toward the proving apparatus which comprises a series of endless chains carrying suspended receptacles for reception of the trays, boards or tins, and when the end of the conveyer is reached suitable mechanism is brought into operation whereby a rapid lateral movement at right angles to that of the conveyer is imparted to each tray in succession whereby it is transferred onto a receptacle of the proving apparatus.

The trays or tins containing the molded loaves are carried through the proving chamber in a circuitous course and as they arrive at the discharge end of said chamber they are transferred by means acting similarly to the transfer of the trays to the prover above described to the front or inlet portion of the oven which latter may be of the type in which the material to be baked travels continuously therethrough or of the ordinary draw-plate or other desired construction.

The invention is illustrated in the accompanying drawings in which—

Figure 1 is a vertical elevation of one end of the apparatus showing the proving chamber and feed device. Fig. 2 is a sectional view of the opposite end of said apparatus showing the proving chamber and discharge device, and Figs. 3 and 4 are detail views of the feed and discharge devices respectively.

In the construction shown 50 designates the proving chamber which contains proving means proper of a substantially known type comprising chains 60 carrying pivoted shelves or supports 61 for reception of the trays or boards or the grouped and integral series of tins before referred to. Said chains pass alternately upward and downward about pulleys 62 and according to this form of the present invention are passed under the floor of the bakehouse or other chamber, as shown, extending at one side or end of the apparatus past the feed device 63 and at the other side or end past the delivery or discharge device 64 which latter conveys the trays or groups of tins directly to the oven 65.

71 designates a conveyer capable of movement at right angles to the movement of the chains and on which the trays or tins are placed by hand and filled while thereon.

The feed device more particularly shown in Fig. 3 and which may be used for either trays or grouped tins but shown as acting in conjunction with the latter comprises a slide or pushing member 66 adapted to be given rectilinear horizontal movement at the required times by means of the levers 67, rod 68 and interrupted gearing 69 whereby the group of tins 70 is pushed off the conveyer 71 directly onto the shelves or supports 61 of the proving chains 60. The gearing 69 is shown as driven from the shaft 72 which drives said chains 60, by means of chain and chain wheels 73, shaft 74 and bevel gearing 75.

Where grouped tins only are being dealt with a similar mechanism to that just described may be used to deliver same from the chains 60 to the oven 65 which in the form shown comprises a traveling endless sole 77. Where however trays or boards 78 with the tins thereon are used it is necessary to use the device more particularly shown in Fig. 4. In this construction the slide 79 is operated in a similar manner to slide 66 described with reference to Fig. 3 but carries the tray 78 on a forward extension 80, lugs 81 holding the tray in place. Above the slide is a finger or plate 82 mounted on a lever 83, the movements of which are controlled by a cam 84 operated from the interrupted gearing 69 by means of a chain 85. In operation the slide rests in position B after the tray has been deposited on the slide by the chains 60; the interrupted gearing then operates the levers 67 and moves the slide forward to position C whereupon the finger or plate 82 descends behind the tins 70 and remains in this position while the slide is moved back, thus stripping the tins off onto the oven sole 77. The slide moves back to position A where the tray is removed and is then again moved forward to position B where it is ready to receive the next tray.

What I claim as my invention and desire to secure by Letters Patent of the United States is:—

1. An apparatus for the final proving of dough preparatory to baking which includes a proving chamber having inlet and outlet, a main endless conveyer positioned to travel through said chamber in a circuitous course and provided with suspended means for supporting dough receptacles; reciprocating means adjacent the inlet of the chamber for feeding the receptacles onto the supporting means of the main conveyer, and reciprocating means for discharging the receptacles from the supports of said main conveyer.

2. An apparatus for the final proving of dough preparatory to baking which includes a proving chamber having inlet and outlet, a main endless conveyer positioned to travel through said chamber in a circuitous course and provided with pivotally suspended means for supporting dough receptacles, means adjacent the inlet of said chamber for feeding said receptacles to the main conveyer comprising an endless feeding conveyer adapted for movement in a direction rectangular to said main conveyer, reciprocating means for transferring the receptacles from said feed conveyer onto the supporting means of the main conveyer, and reciprocating means adapted to discharge the receptacles from the supports of said main conveyer.

3. An apparatus for the final proving of dough preparatory to baking which includes a proving chamber having inlet and outlet, a main endless conveyer positioned to travel through said chamber in a circuitous course, and provided with suspended supports for dough receptacles, means adjacent the inlet of said chamber for feeding the receptacles onto said supports comprising a reciprocating slide and interrupted gearing operatively connected therewith, and means for discharging the receptacles from said supports, said means comprising a reciprocating slide and interrupted gearing operatively connected therewith.

4. An apparatus for the final proving of dough preparatory to baking which includes a proving chamber having inlet and outlet, a main endless conveyer positioned to travel through said chamber in a circuitous course and provided with suspended supports for dough receptacles, means adjacent the inlet of said chamber for feeding the receptacles onto said supports comprising a reciprocating slide and interrupted gearing operatively connected therewith, and means for discharging the receptacles from said supports, said means comprising a slide reciprocatable in a direction at right angles to said conveyer, interrupted gearing in operative connection with said slide, and a stopping finger adapted to remove the receptacles from said slide during the reciprocation thereof.

5. An apparatus for the final proving of dough preparatory to baking which includes a proving chamber having inlet and outlet, a main endless conveyer positioned to travel through said chamber in a circuitous course and provided with pivotally suspended means for supporting dough receptacles, means adjacent the inlet of said chamber for feeding said receptacles to the main conveyer comprising an endless feeding conveyer adapted for movement in a direction rectangular to said main conveyer, means for transferring the receptacles from said feed conveyer onto the supporting means of the main conveyer, said means comprising a reciprocating slide and interrupted gearing in operative connection therewith, and means adapted to discharge the receptacles from the supports of said main conveyer, said means comprising a reciprocating slide and interrupted gearing in operative connection therewith.

In witness whereof I have signed this specification in the presence of two witnesses.

GEORGE SAMUEL BAKER.

Witnesses:
   H. D. JAMESON,
   C. A. REYNOLDS.